United States Patent
Halstead et al.

(10) Patent No.: US 10,515,106 B1
(45) Date of Patent: *Dec. 24, 2019

(54) SYSTEMS AND METHODS FOR PROCESSING A DATABASE QUERY

(71) Applicant: Infosum Limited, Basingstoke (GB)

(72) Inventors: Nicholas Halstead, Hook (GB); Eike Spang, Basingstoke (GB)

(73) Assignee: Infosum LImited, Basingstoke (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,368

(22) Filed: Oct. 1, 2018

(51) Int. Cl.
*G06F 7/00* (2006.01)
*G06F 16/33* (2019.01)
*G06F 16/38* (2019.01)

(52) U.S. Cl.
CPC .......... *G06F 16/334* (2019.01); *G06F 16/381* (2019.01)

(58) Field of Classification Search
CPC ......... G06F 17/30595; G06F 17/30371; G06F 17/30345; G06F 17/30604; G06F 17/30879
See application file for complete search history.

(56) References Cited

U.S. PATENT DOCUMENTS

| | | | | |
|---|---|---|---|---|
| 6,064,666 A * | 5/2000 | Willner | ............... | H04M 3/4228 370/352 |
| 6,456,308 B1 * | 9/2002 | Agranat | .................... | G06F 8/20 715/854 |
| 6,671,407 B1 * | 12/2003 | Venkatesan | ........... | G06T 1/0028 382/232 |
| 6,920,631 B2 * | 7/2005 | Delo | ......................... | G06F 8/61 717/174 |
| 8,438,184 B1 * | 5/2013 | Wang | ...................... | H04L 67/02 707/780 |
| 2004/0088320 A1 * | 5/2004 | Perry | ....................... | G06F 16/86 |
| 2007/0112802 A1 * | 5/2007 | Volanen | .................. | G16C 20/90 |
| 2008/0228043 A1 * | 9/2008 | Kenedy | ................... | G16H 50/30 600/300 |
| 2008/0228677 A1 * | 9/2008 | Kenedy | .................. | G16H 50/30 706/13 |
| 2012/0215763 A1 * | 8/2012 | Hughes | ............... | G06F 16/2471 707/718 |
| 2015/0058950 A1 * | 2/2015 | Miu | ....................... | H04L 63/105 726/7 |
| 2015/0059003 A1 * | 2/2015 | Bouse | .................. | G06F 16/2228 726/28 |
| 2018/0060523 A1 * | 3/2018 | Farh | ........................ | G06N 5/022 |

\* cited by examiner

*Primary Examiner* — Daniel A Kuddus
(74) *Attorney, Agent, or Firm* — BainwoodHuang

(57) ABSTRACT

Systems and methods of determining, from an identity database, raw identifiers of entities satisfying a set of attributes. The identity database does not hold the set of attributes in association with any identifiers in the identity database. An interrogation data structure is provided which represents encoded identifiers of entities satisfying the at least one attribute. The interrogation data structure is applied to encoded identifiers held in the identity database in association with respective raw identifiers to determine any raw identifiers which correspond to the encoded identifiers in the interrogation data structure.

19 Claims, 13 Drawing Sheets

```
columns:
    hashed_pid: BYTES
    debt: UINT64
    storecard_balance: INT64
    credit_score: DOUBLE
    have_life_insurance: BOOLEAN
    number_of_credit_cards: UINT64
    address_1: TEXT
    address_2: TEXT
    address_3: TEXT
    post_code: TEXT
keys:
    - hashed_pid
credentials:
    user: dev
    password: dev
    database: database1
    address: 192.168.1.130:3306
redaction_threshold: 1000
bin_redaction_threshold: 100
max_database_connections: 151
store: mysql
executors: 4
```
⎬ 56

FIG. 7a

SYSTEMS AND METHODS FOR PROCESSING A DATABASE QUERY

FIELD

The present invention relates to accessing databases, and particularly but not exclusively to accessing one or more independent databases to provide a response to a query.

BACKGROUND

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this.

Techniques for using more than one database to satisfy a single query having multiple expressions are known. According to one technique, two independent datasets are firstly merged together so that they exist as a single dataset which can then be queried with the multiple expressions. This procedure can require the transfer of large amounts of data, and a complex merging exercise at the receiving end.

Nowadays every company holds valuable data, for example concerning attributes of consumers or potential consumers who may wish to access that data. Sharing customer data among different companies creates complex privacy and legal issues, as the data contained in customer records may be shared involuntarily. The problem is exacerbated by the fact that different departments within the same company, or among different companies, may store data at different locations, and thus moving and selling data across sites poses security risks that may result in value leakage. Furthermore, different companies' storage formats are often not compatible and therefore increases the complexity in sharing customer data.

In the United Kingdom, the general data protection regulation defines a number of important principles around the storage of data. These principles include data minimisation, storage limitation and purpose limitation. For the purpose of data minimisation, the regulation states that personal data shall be adequate, relevant and limited to what is necessary in relation to the purposes for which they are processed. For storage limitation, the regulation states that personal data shall be kept in a form which permit identification of data subjects for no longer than is necessary for the purpose of which the personal data are processed. This regulation and other similar regulations in other countries have placed further constraints on the storage and access of data. This is in direct conflict with increasing requirements of companies to utilise data for the purpose of analysing and gaining insights.

SUMMARY

A technique has been developed by the present Applicants for anonymously extracting information from multiple datasets, i.e. without the extracting party having or requiring access to individual data entries in the data sets. This technique is described in Applicant's earlier patent application WO2018096062.

The output of such a technique is an anonymised, aggregated set of result entries which satisfy one or more expression of an input query. A perceived advantage of this technique is that it is not possible from the aggregated set of result entries to determine identifiers of specific data entries which satisfy the input query. However, there are circumstances when it may be desirable, subject to relevant permissions, to have access to identifiers of the specific entities corresponding to the result entries.

Embodiments of the present invention which are described in the following enable specific identifiers of some or all of the result entries to be accessed from an anonymised set.

The set of result entries could be a list of hashes, or a binary structure such as a bloom filter, in which each location has a value, e.g. bit (or binary number) set to indicate presence or absence of an entry in the structure.

In the technique described in patent application WO2018096062 the main focus is on generating anonymised results. However, there may be circumstances where an entity may legitimately own the rights to access and use raw identifiers. For example, they may be permitted to own and use email addresses, mobile phone numbers or other keys or contact information for entries in a database. In such a scenario, there is no reason why they should not be enabled to understand which entities contribute to a set of results following a query. Techniques described in the following enable this to be done in a secure way, without enabling unauthorised users to access the raw identifiers resulting from a query. The techniques described herein can be used independently or alongside the techniques described in the earlier patent application. That is, by providing access to raw identifiers together with aggregated statistics. Furthermore, while the technique described in applicant's earlier patent application WO2018096062 allows multiple data sets to be joined, the principles of the present invention may be utilised in the circumstance where a single attribute database is accessed. In this case, there is still a benefit to be had, particularly in circumstances where access permissions for the attribute database may be different from access permissions for the raw identifiers themselves. Therefore, while the described embodiments focus on scenarios where attribute databases are firstly joined, and then the result supplied to an identity database, the invention is not to be so limited.

According to one aspect of the present invention there is provided a method of determining from an identity database raw identifiers of entities satisfying a set of attributes, wherein the identity database does not hold the set of attributes in association with any identifiers in the identity database, the method comprising: providing an interrogation data structure which represents encoded identifiers of entities satisfying the at least one attribute; applying the interrogation data structure to encoded identifiers held in the identity database in association with respective raw identifiers to determine any raw identifiers which correspond to the encoded identifiers in the intermediate data structure.

The interrogation data structure may be provided by accessing, with a query defining the set of attributes an attribute database which holds attributes in association with respective identifiers to determine a set of result entries in the attribute database which satisfies the set of attributes; and encoding the identifiers of the set of result entries to generate the interrogation data structure wherein access permissions for the attribute database are different from access permissions for the identity database.

Multiple interrogation data structures may be provided by accessing respective attribute databases with respective queries. The queries may be the same, applied to different databases, or different.

Interrogation data structures may be combined by performing one or more set operation on two or more of the interrogation data structures to generate a set-operated interrogation data structure to apply to the identity database.

The step of applying the interrogation data structure to encoded versions of identifiers held in the identity database may comprise performing a set operation to separate a first set of raw identifiers from a second set of raw identifiers based on encoded identifiers in the interrogation data structure.

The set operation could be one of: a match operation to extract a set of raw identifiers which correspond to the encoded identifiers in the interrogation data structure; and an exclusion operation to extract a set of raw identifiers which do not correspond to the encoded identifiers in the interrogation data structure. Any suitable set operation could be used, particularly those suitable for bloom filters.

The or each interrogation data structure may be stored with a respective unique identifier which associates the interrogation data structure with the query. Note that the unique identifier can be such as not to reveal any information about the underlying query or original attribute database, to increase separation between different owners with different access permissions. This feature enables the interrogation datastructures to be published and/or widely used without compromising integrity of the source data.

The or each interrogation data structure may be applied to at least one further identity database which holds respective raw identifiers in association with encoded identifiers, but which does not hold the set of attributes in association with any identifiers in the further identity database.

The step of applying the or each interrogation data structure to encoded versions of identifiers held in the identity database may generate one or more result data structure which indicates the first set of raw identifiers resulting from the set operation.

In one application, the method comprises the step of supplying from a requestor a raw identifier, encoding the raw identifier and testing the encoded raw identifier against the, or at least some of the result data structure(s) to determine whether or not that raw identifier possesses the set of attributes.

In another application, the method comprises publishing the, or at least some of the, result data structure(s) for access by at least one third party who has access permissions to a third party database comprising identifiers of entities but who does not have access permissions for the identity database.

Multiple result data structures may be stored with respective unique identifiers.

In some embodiments a set operation may be performed on two or more of the result data structures to generate a set-operated result data structure.

The interrogation data structure may be one of: a list of hashes, each hash representing an encoded identifier, a bloom filter with values set at locations corresponding to hashes of the encoded identifiers, or any suitable data structure for holding anonymised information in a manner allowing it to be applied to a database.

Similarly, the result data structure may comprise one of a list of hashes, each hash representing an encoded identifier, a bloom filter with values set at locations corresponding to hashes of the encoded identifiers and any other suitable data structure.

The raw identifiers when accessed may be in plain text form, allowing the entity to be identified in an unanonymised way. The raw identifiers may enable an entity identified by the identifier to be contacted, for example by an email address or mobile telephone number or any other suitable contacting mechanism. This allows the finally produced set of raw identifiers to be used to send electronic messages to the entities, which may be relevant to them based on the source query.

The method is suitable to be used with the datajoining techniques already developed by the applicants. In that case, the query defines at least one further attribute, the method comprising: applying the identifiers of the first set of result entries to a second attribute database, with the at least one further query, to generate a second set of entries, the second set constituting the interrogation data structure.

Another aspect of the invention provides a computer system for determining from an identity database raw identifiers of entities satisfying a set of attributes, wherein the identity database does not hold the set of attributes in association with any identifiers in the identity database, the computer system comprising: electronic storage configured to store an interrogation data structure which represents encoded identifiers of entities satisfying the at least one attribute; and a processor configured to execute a computer program which applies the interrogation data structure to encoded identifiers held in the identity database in association with respective raw identifiers to determine any raw identifiers which correspond to the encoded identifiers in the interrogation data structure.

A computer program product comprising computer readable instructions on a transitory or non-transitory medium for implementing the method is also provided.

According to the concept described herein, a so-called tagging bunker is created which contains raw identifiers (such as phone numbers or emails) in association with hashed identifiers. In some versions, the hashed identifier is a hashed version of the raw identifier. In other versions, the hashed identifier may be the hash of another identifier (such as a mobile phone number) which is associated with the raw identifier (such as an email address). In this context, an association implies that both of the identifiers identify the same person or entity.

In one embodiment of the earlier application, a list of hashed identifiers, or a bloom filter with values set representing such hashed identifiers, is provided as an output of a query. In aspects of the present invention, that output (list of hashes or bloom filter) can be associated with the query (for example, in a store) and then used in real-time or later to access the tagging bunker. In this way, a query may be run against an attribute databases (or a query with multiple attributes may be run against multiple attribute databases), as described in our earlier patent application WO2018096062, and then the results applied against the tagging bunker to determine an intersection. Note that the tagging bunker may not include all raw identifiers corresponding to the set of result entries in the list of hashes or bloom filter. However, any raw identifiers which intersect with the result entries will be provided to an authorised owner of the tagging bunker. Note that the owner of the tagging bunker is interested in entries in his ownership, such that he may legitimately use them for a particular purpose associated with the attribute. Other access modes are possible. For example, results may not be visible to the owner of the tagging bunker, but to the executor of the query. The advantage of the techniques laid out herein is that visibility of raw IDs may be granted only to entities with the relevant permissions and denied to others.

The method may include storing the or each interrogation data structure with a HyperLogLog (HLL) structure which provides information (i.e. a distinct count value) for the key(s) in the interrogation data structure.

Aspects of the present invention also have the advantage that people who are extracting information from the tagging bunker may not be the same as the people who ran the original query against the attribute database(s). By storing the list of hashes or bloom filter in association with a query identifier in a store, a separation can be made which enables a third party to extract information from the tagging bunker. Alternatively, a list of raw identifiers may be held in a separate store. This can enable, for example, third parties to query the store to determine (using a raw identifier of a user) whether or not a particular user was returned against a particular attribute (and from the tagging bunker). In another arrangement, the original query could be executed against the attribute database(s) and then stored with a query identifier. Later, the query identifier could be used to access the result entries associated with the query and apply them to the tagging bunker to access the raw identifiers.

Alternatively, the list of result entries (hashes or bloom filter) could be made generally available with an identification of the query parameters for anyone to apply against their own tagging bunker. The term bunker is used herein to denote a database (or dataset), the server on which it is stored, and a respective local database agent (drone) facilitating management and access of the database.

The techniques described herein address matters raised in the GDPR referred to above. The aspect of data minimisation is addressed because the platform keeps datasets in their original decentralised form, which minimises the information gathered in any one location. Attribute information held in the attribute database(s) is partitioned from personal information held in the tag bunker. Moreover, the intent of a particular query may be further separated (by running the query and storing it just with the query identifier for later use against the tagging bunker). The aspect of storage limitation is addressed because only the raw identifiers permit identification of data subjects, and these are not held in conjunction with any attributes enabling any particular purpose. The tagging bunker by itself does not reveal any attributes of any entities.

For a better understanding of the present invention and to show how the same may be carried into effect, reference will now be made by way of example to the following drawings.

BRIEF DESCRIPTION OF DRAWINGS

FIG. 7a is an example of the configuration file as illustrated in FIG. 7;

DETAILED DESCRIPTION

The terms database and datasets are used interchangeably herein to denote a structured set of data records. In practice a dataset may comprise multiple databases under a common control (not independent).

Figure 1:
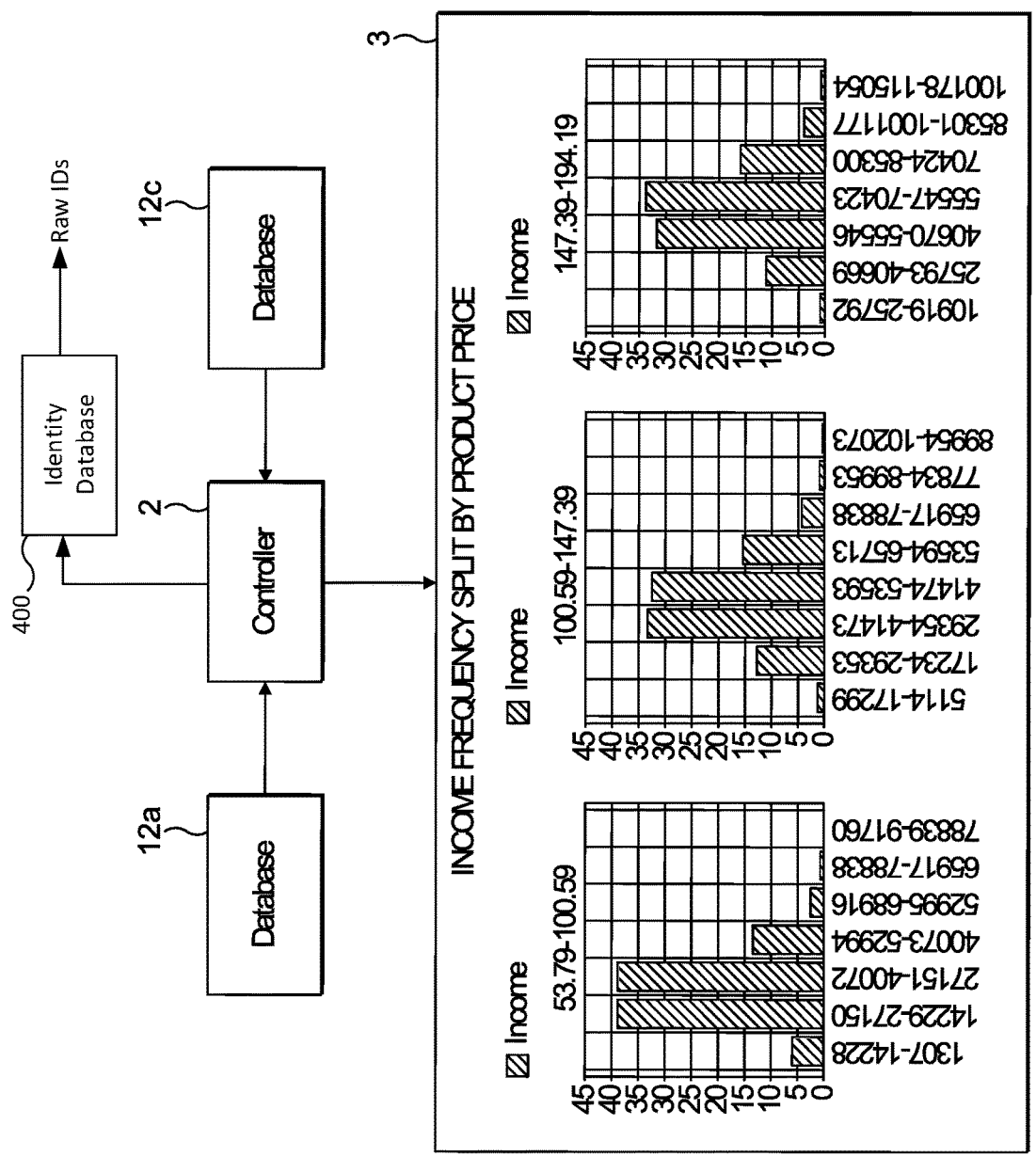
FIG. 1 is a schematic diagram illustrating a data joining system at a high schematic level.

FIG. 1 is a schematic diagram of an architecture for querying multiple databases. Reference numeral 12a denotes a first database (e.g. a database of a financial organisation) which holds certain attributes within its records (entries). Reference numeral 12c denotes a second database (e.g. a database of a retail organisation) which holds certain attributes within its records (entries). The attributes in one database may be different to the attributes in the other database. Some entities may exist in both databases, and the solution enables knowledge from both databases to be combined by joining data in a fully privacy compliant way without any records leaving each company's data centre. Reference numeral 2 denotes a controller which provides such a data joining service. An example output graph visible to a user is denoted by reference number 3; in this example it provides information on the spending habit of customers categorised by their annual income.

Embodiments of the present invention provide an alternative form of output, which is the ability to obtain, securely and privately, by authorised parties, raw identifiers of results of the 'join'. This is attained by the application of an interrogation datastructure, such as a bloom filter or list of hashes, to an identity database or tagging bunker 400, which will be described in detail later.

Figure 2:
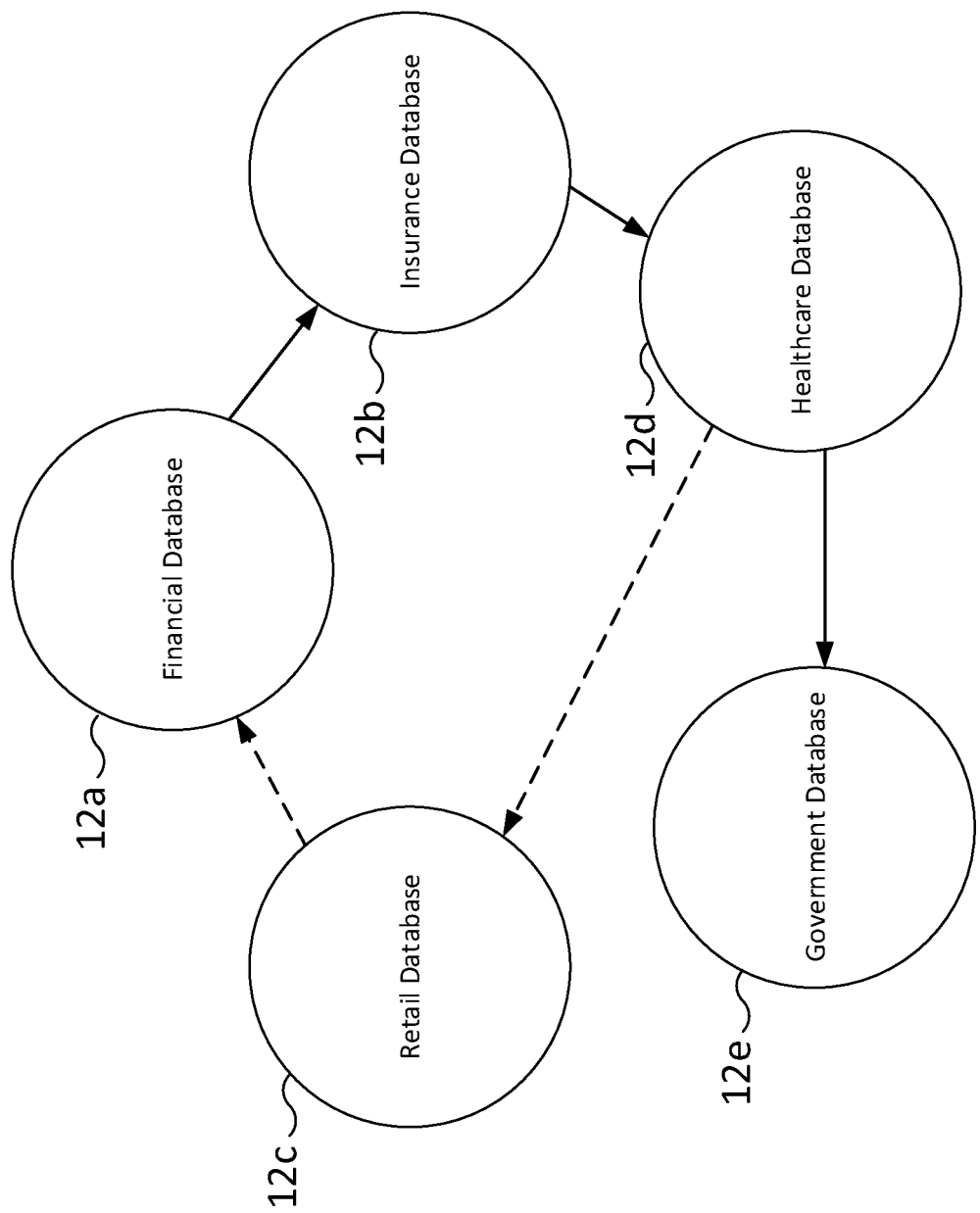
FIG. 2 is a diagram illustrating the method of data joining.

FIG. 2 shows schematically how data joining works for a data joining system with three organisations (Healthcare 12d, Retail 12c and Financial 12a) shown by the dotted arrow, and for four organisations shown by bold arrows (Government 12e, Healthcare 12d, Insurance 12b and Financial 12a). In any case, queries can be created according to the existing datasets at each of the queried companies, in order to fully utilise all of the data available. A suitable filter, such as a list of hashes or bloom filter, is created from a first query to be applied to one or more of the fields within each dataset to filter entries to be checked against a second query. Those entries in the dataset matching the second query run against the filtered entries are then sent back to the cloud as returned data. The joining of combined datasets creates greater knowledge than a single database can offer on its own and in some cases allow new datasets to be created. Common identifiers (or joining factors), such as email address and telephone number, are used to identify data associated with a particular entry across different datasets. In some cases different common joining factors may be use depending upon their availability in the target datasets. The final results as presented to the user can be originated from any one of the queried organisations, but each of the returned data can be configured to meet individual privacy/redaction policies.

Data joining as described herein may be employed to join internal data from databases belonging to the same entity, external data from databases owned by a plurality of entities, or data from databases physically located across different countries. For example when joining internal data, the data joining system provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared. Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

Databases which can be accessed using the data joining service form a data joining network. As more companies subscribe to the data joining network, they each form a node on the network and become a part of a combined dataset that incorporates many small datasets, e.g. the data joining network may act as a central database. Furthermore, there is no limit to the number or size of the combined datasets across the subscripting companies, whilst each of them remain in control of who they wish share their knowledge with.

Figure 3:
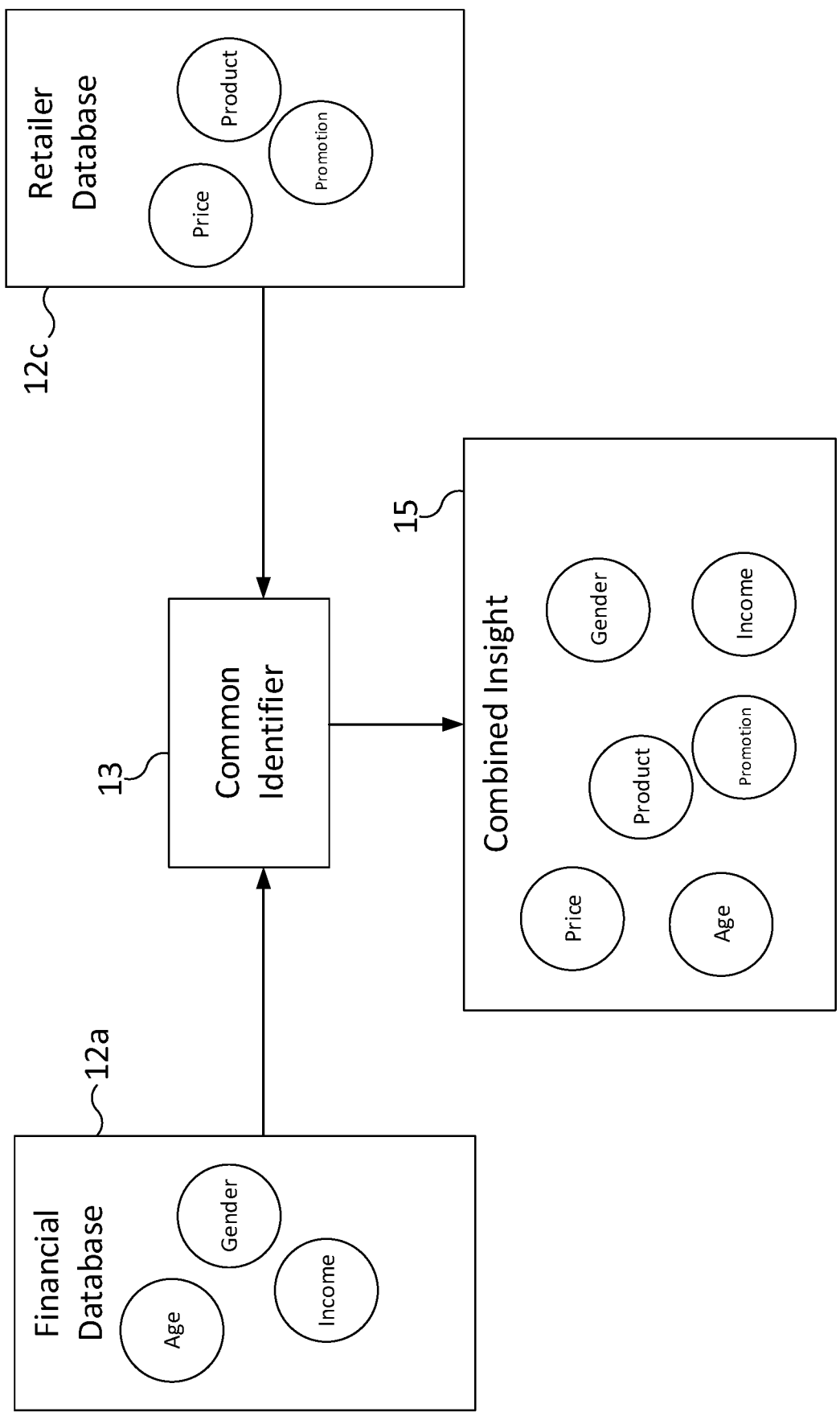
FIG. 3 is a schematic diagram illustrating a specific example where customers' transaction data is joined with their corresponding demographics data from two independently controlled databases.

FIG. 3 illustrates a specific example where a retailer cross-examines customers' transaction data and purchase history (e.g. price, product and promotion of past purchases) with their corresponding demographics data (e.g. age, gender and income) from a bank's dataset, using email addresses as a common identifier 13 (or joining factor). This provides a combined insight of customers 15 and allows the retailers to create bespoke promotion strategies for their target customers. For example, the combined dataset between the bank and the retailer reveals which promotions are used most frequently by different aged customers and based thereon tailor promotion strategy.

The controller 2 can be embodied in the 'cloud' to provide a cloud service that facilitates data joining. The cloud service stores instructions for data acquisition (e.g. filtering expressions), but not the actual returned data. Moreover the queries can be controlled in real time and so they can be terminated as required.

Previously, a common form of output was to generate the result data in statistical form so that customer records associated with the returned data never leave the owners' database. However, there is a requirement in some cases to allow an authorised user to access the raw identifiers (such as email address or telephone number) of the data entries in the returned data.

In terms of access control, each sharing database may be given its own set of access control so to allow bespoke control on who they wish share their knowledge with. This prevents accidental sharing of commercially sensitive data that would otherwise be detrimental to the owner of the sharing database. Restriction may also be imposed on queries requesting sensitive combination of fields in the dataset.

The described architecture allows data from multiple discrete databases to be combined, allowing different owners of databases to consent to mutual use of each other's data without compromising security of their own database or anonymity. An enhancement described herein permits an owner or authorised user of a dataset to 'de-anonymise' results which have entries in that dataset.

Figure 4:
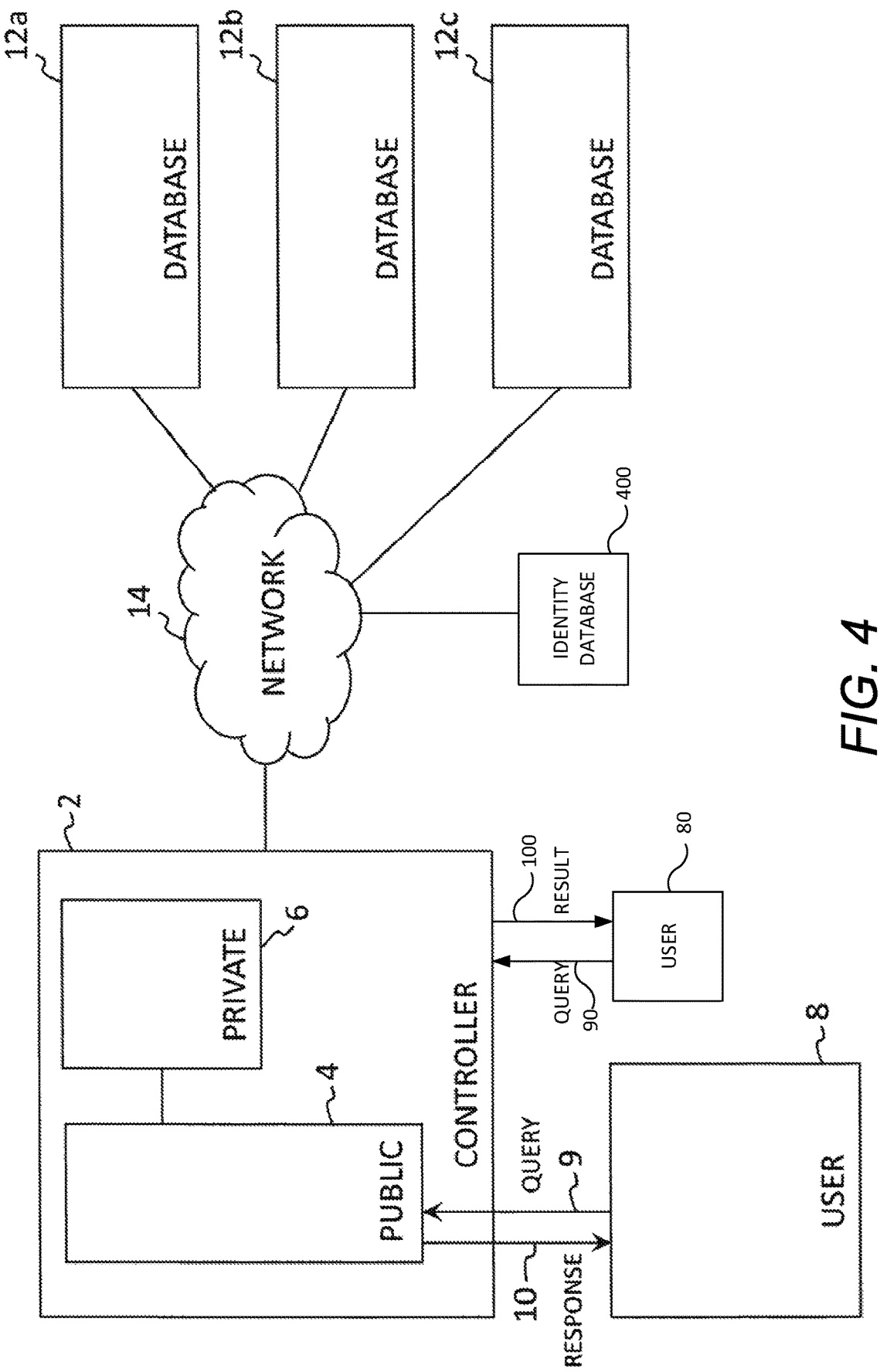
FIG. 4 is a schematic diagram illustrating a possible architecture for implementation of some embodiments.

FIG. 4 is a more detailed schematic block diagram of a system in which data from multiple discrete databases can be combined upon receiving a query from a querying user. The system comprises the central controller 2 which has a publically accessible component 4 and a set of private components 6 which implement a data combining process. The central controller can be implemented by software, firmware or hardware or any combination thereof. It could be a single server executing a computer program, or distributed over multiple servers, each running a load computer program, autonomously or in a distributed computing fashion. A user 8 has access to the controller 2 via a public interface, for example, which can be an application programming interface (API) in the controller 2. A user could be in contact with a controller 2 in any other way. Reference to a user herein refers to a user and/or a user device which can be any suitable computer device capable of generating and exchanging electronic messages. In particular, a user can generate a query 9 which he wants to run over multiple databases. That query can be generated by a human user providing manual input at an interface of a computer device, or it can be generated autonomously and automatically by a computer device itself.

The user 8 receives a response 10 following data combining processes carried out at the controller 2. The response 10 can take the form of a set of target (result) entries resulting from combining the entries in the databases which satisfy expressions in the query. Alternatively, the response 10 can take the form of aggregated data.

FIG. 4 further illustrates that in an embodiment of the invention a different type of query may be addressed to the controller 2. A separate user 80 is shown diagrammatically. Note that in practice this user 80 might be the same as user 8, but it is more likely that it will be a different kind of user. The user 80 can submit a query 90 which contains at least one attribute. The result 100 which is returned in response to this query pertains to raw identifiers of entities in an identity database 400. The result could be raw identifiers itself, information about which raw identifiers were available, or a data structure indicating the location of such raw identifiers in the identity database. All of these use cases are discussed in more detail later. The identity database is connected to the controller via network 14, along with multiple databases 12a, 12b and 12c.

It can be connected via any suitable communication network 14, which could be a private Intranet or public Internet. Before going into a more detailed description of the architecture of the system, the basic principles of the data combining process will now be described, together with the enhancement enabling identifiers to be extracted for a set of results. For this, reference is made to FIG. 5.

Figure 5:
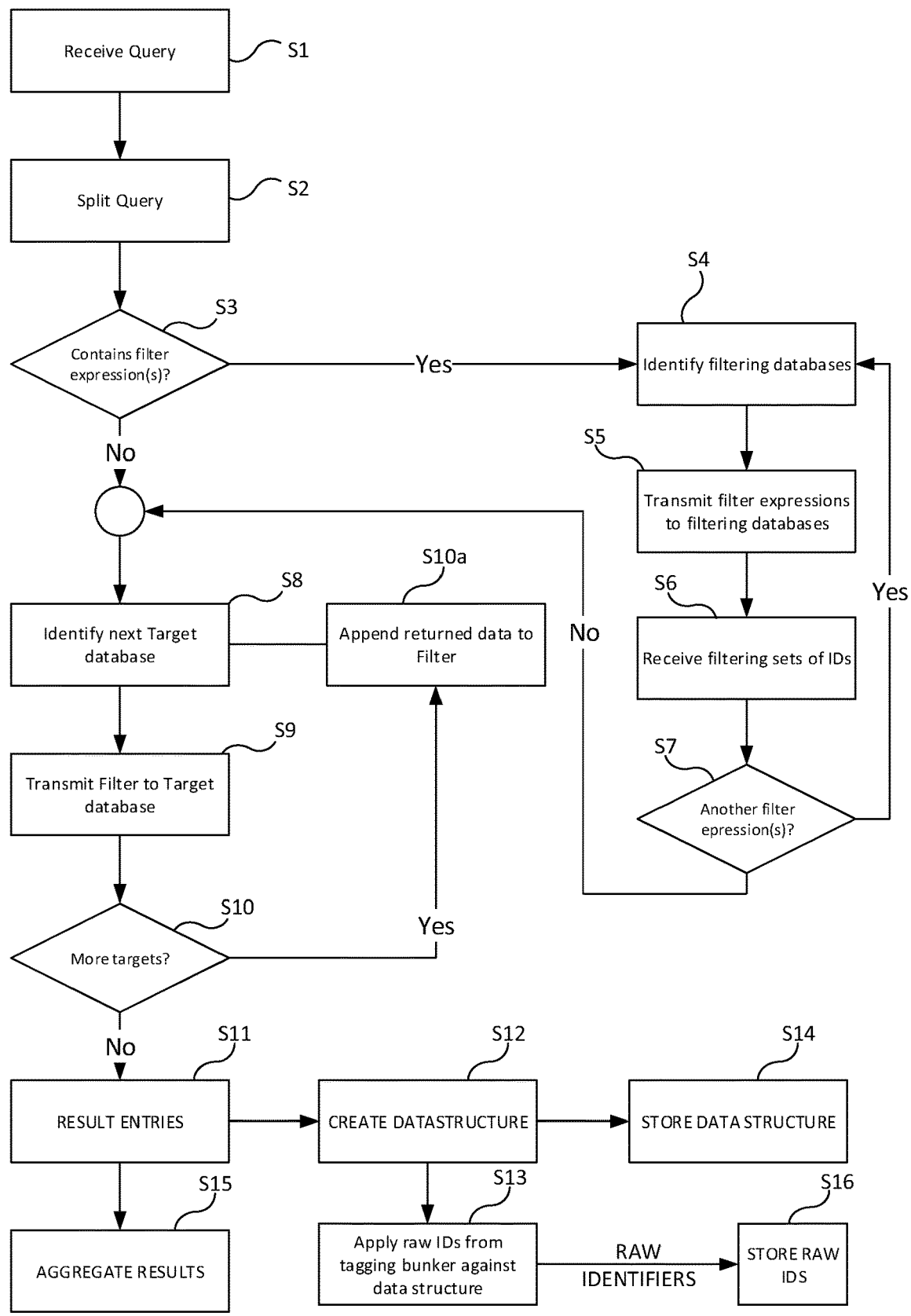
FIG. 5 is a flowchart illustrating processes carried out at a central controller.

As illustrated in FIG. 5, the first step of the process is the receipt of a query by the central controller 2 from the user 8, step S1. The query 9 comprises one or more target "columns" to receive data or statistics, and a set of filter expressions which the data or statistics should satisfy. For example, the query could ask for the number of data entries satisfying a certain age range and certain gender specification.

At step S2, the query is split into two queries, which are referred to herein as a filtering query and a target query. Note that the query may relate to a single expression to identify a single attribute. In that case, the query is not split and can be applied directly to a target data base (S9) without the intervening steps now to be described. At step S3, a check is made to see whether or not the filter query contains filter expressions. If it does, the flow moves to step S4. At step S4 filtering databases are identified, each database being selected as the most appropriate database to deal with the particular filter expression. The central controller 2 stores information about all the databases to which it has access to allow it to identify appropriate filtering databases. This information is stored using a drone graph (44 in FIG. 7) described later. Each database is associated with a drone, which serves as a database agent on the software side. For example, the controller can identify which of the databases contains information related to the required filtering expression. At step S5, each filter expression is sent to the most appropriate database. When the first filter expression is sent to the first filtering database, it is run against the database to identify entries in that database matching the terms of the filter expression. For example, if the first required expression is an age range between 18 to 25, a filtering set of identifiers is returned from that database identifying database records satisfying the expression, for example, all the entities in the database aged between 18 to 25. Thus, the age range has produced a filtered set of identifiers. This filtered set can then be transmitted to a subsequent filtering database to act as a filter along with the next filter expression of the query, wherein the next filter expression is compared only to the entries in the database which satisfy the identifiers of the filtered set. Step S6 denotes the function of receiving the filtering sets of IDs, and step S7 the determination of whether there are additional filtering expressions. Once all filtering expressions have been utilised and run against their respective filtering databases, a final filtered ID set is produced. The process then moves to step S8 where a target database is identified for execution of the target query. For example, the target query in this case could be gender-based, for example, identify all females. In step S9, the filtered dataset and the target query are applied to the identified target database where the target query is run only against the identifiers which satisfy the identifiers in the filtered dataset. Note that a single filter expression can be sent to multiple databases, or multiple filter expressions can be sent to a single database. Note also, that in some cases there may be no filtering expressions (step S3) in which case the target query is just passed straight to one or more target database. It is important to recognise that no data records are transferred, only record IDs.

Note that there may be more than one target database, as well as or instead of, multiple filtering databases. Thus, a database could both produce a result set of record data and a filtering set of identifiers for a subsequent query. Note that one expression may be run against multiple databases, for example when more than one database satisfies the expression, but perhaps with incomplete records.

Step S10 checks for whether there are any more target queries or more target databases that need to be addressed with the target query and in the case that they are, the returned data is appended to the filter S10a and steps S8 and S9 run again on the next target database. Note that FIG. 5 refers to the joining of attribute databases-aspects of the invention can be utilised where a single expression query is applied to a single attribute database to return a set of result entries.

When the one or more attribute database(s) have been queried, the final results are returned in step S11. The set of data entries in the final result is used to create an interrogation data structure S12 such as a list of hashes, or a binary structure such as a bloom filter, with values set at locations representing data entries in the final result. Such an interrogation data structure may be translated into actual (raw) identifiers of entities corresponding to the data entries by applying raw identifiers of an ID database 40 to the data structure, step S13. Note that applying the interrogation datastructure to the ID database (or equivalently applying the raw IDs of the tagging bunker to the interrogation datastructure may involve any kind of set operation which separates the raw IDs into different sets, such as a match operation or exclusion operation. Moreover, different interrogation data structures may be generated by applying the same query to different filtering/target data bases, or different queries to the same database. These interrogation datastructures may be combined by performing one or more set operations to produce a set-operated datastructure for applying to the tagging bunker. A set-operated data structure is a data structure which results from the application of one or more set operations to two or more data structures, as just exemplified. Step S13 may be carried out directly, or the data structure may be stored (S14) with a query identifier for subsequent comparison with one or more tagging bunker. When the raw IDs from a particular query and particular tagging bunker have been accessed, they can be stored in a separate store (S16) in association with list identifiers. In some embodiments, to increase data protection, the list identifiers do not reveal the nature of the underlying query. Note that the results may also be formatted as a set of anonymised data entries and aggregated statistics, depending on the context in which the method is applied (S15).

Lists from different queries/databases/tagging bunkers may also be combined in set operations. Knowledge of the underlying query/attribute/tagging bunker may depend on access permissions.

Figure 6:
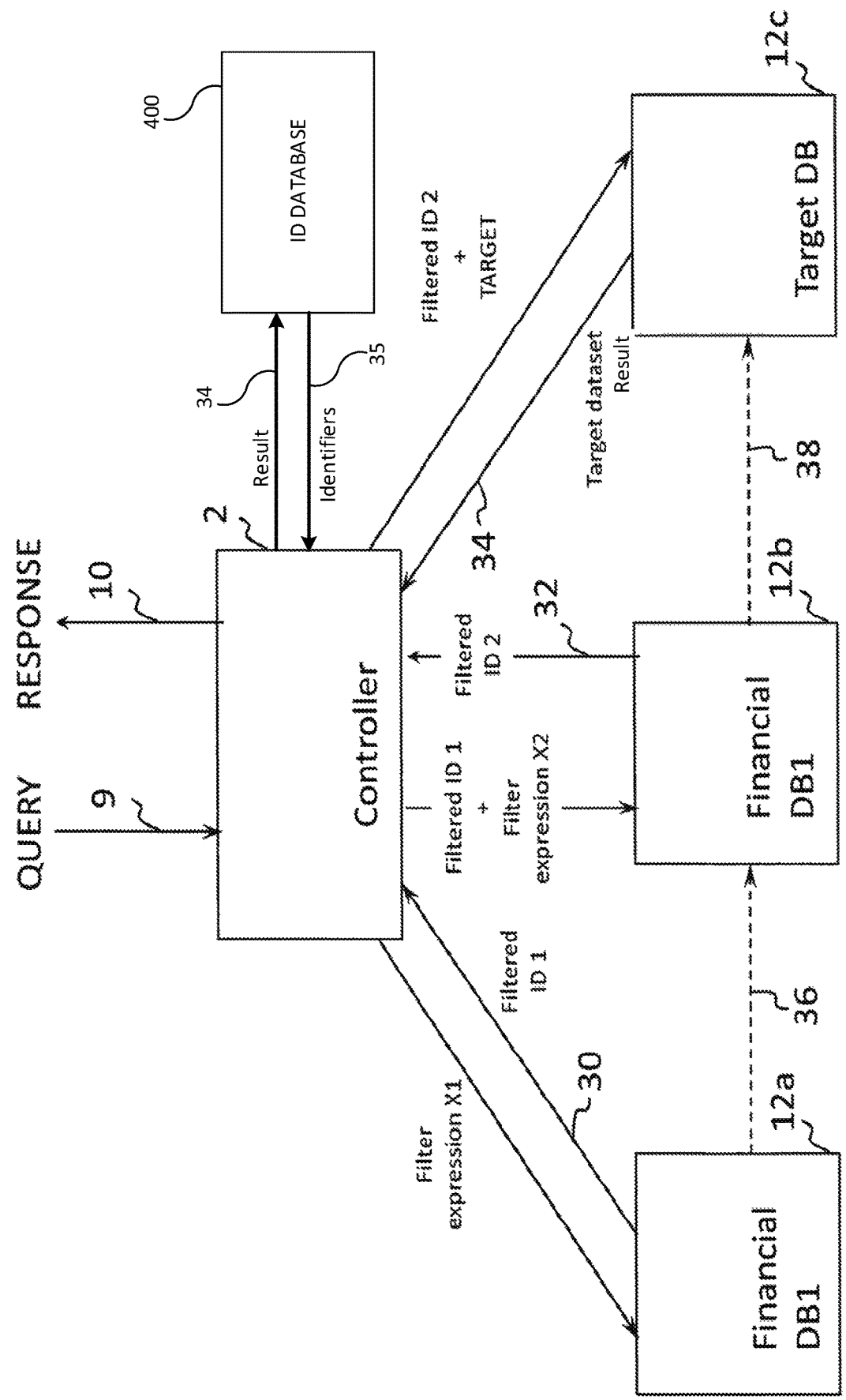
FIG. 6 is a schematic diagram illustrating the flow of FIG. 5.

FIG. 6 is a schematic architectural diagram which gives one example of the flow described with reference to FIG. 5. As shown in FIG. 6, a query 9 is received at the controller 2. In this case, the controller 2 splits the query into three separate queries, a first query with a first filter expression X1, a second query with a second filter expression X2, and a third target query with a target expression TARGET. As an example, the first filter expression could be an age range (e.g. between 18 to 25), the second filter expression could be income (e.g. more than £60,000) and the target expression could be gender (i.e. all females). The first query with the first filter expression X1 is sent to the first database 12a of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set constitutes an interrogation data structure which can comprise a list of hashed identifiers, where each identifies a data entry in the database, or can be a bloom filter or other form of binary structure.

Although the binary structure itself is entirely anonymized in that the records written to it cannot be derived from the binary structure itself (alone), the binary structure can be passed to a tagging bunker to allow information to be extracted. The tagging bunker stores a list of identifiers of records (e.g. names of users). These identifiers can be hashed and tested against the binary structure to see if they are contained in it. Hashes may be stored with their identifiers or generated on the fly. If so, then it can be determined that that record satisfies the original input query. This is described in more detail below, following a description of bloom filters as an example of a suitable binary structure within the context of the present invention.

A bloom filter is commonly applied to test whether an element is a member of a set. It consists of a set of positions which can be set to '1' or '0' [or a binary number] depending on whether the position is occupied. In the present context, the positions represent identifiers, and each identifier identifies one or more rows of the database. More specifically, a bloom filter tests whether an element is certainly not present and therefore removes the need to seek elements that don't exist in a set. A bloom filter query returns a result of either "possibly in set" or "definitely not in set". A bloom filter is particularly useful if the amount of source data would require an impractically large amount of memory if "conventional" error-free hashing techniques were applied. It provides another level of anonymity compared with a list of hashes. The use of bloom filters (and other binary structures) is described in more detail below in reference to FIGS. 9, 10 and 11.

The filtered ID set 1 and the second query with the second filter expression X2 is then addressed to the second database 12b of another financial organisation labelled Financial DB2. This database has been identified by the controller as being a good database for extracting income-related data.

The query which is run over the second filter database is a query which matches the second filter expression X2 against only those database entries identified by the filtered ID set 1. This is therefore potentially a faster query to run and might reduce the number entries in the result of data. Moreover, note that there has been no requirement to "join" the records of the first and second filter databases into a common dataset. Thus, these databases can be completely independent, logically and/or geographically and do not have to have any common control or ownership. Note also that no raw data (database records) is transferred.

A second filter ID set 2, 32, is returned to the controller 2 following the query which is run on the second filtering database Financial DB2 12b. The controller 2 sends the second filter ID set 2 and the target expression to a target database which it has identified. The set of data entries forming the result 34 of running the target expression TARGET against the identifiers in the filter dataset 2 (or the bloom filter) is returned to the controller 2. The set of data entries can be another list of hashes or another bloom filter representing the set. In the enhancement described herein, they are applied to an ID database 400, which stores unanonymised identifiers 35. The controller 2 provides the response 10 to the user, which is either raw data, aggregated data or a set of unanonymised identifiers.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 6.

Figure 7:
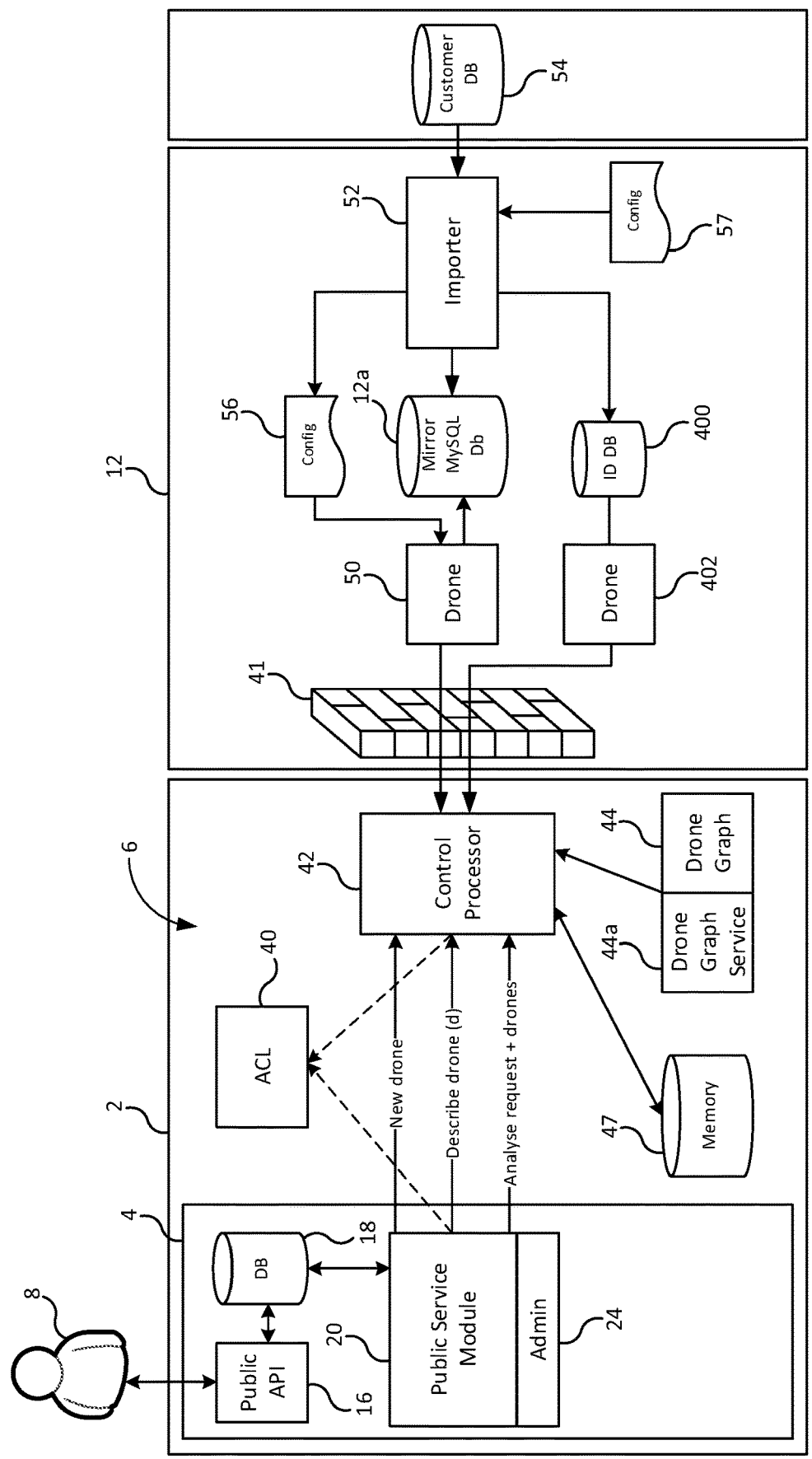
FIG. 7 is a more detailed architectural diagram of a computer system for accessing multiple independent databases.

FIG. 7 is a more detailed architectural diagram illustrating the component at the controller 2 and at a database site 12. The term "database site" is used herein to denote any site where one or more databases may be located. A database may alternatively be referred to herein as a "customer site", indicating that the database is owned by a particular customer. One distinct advantage of the described embodiments is that searches may be done across multiple databases which may be individually owned by different customers. One such database site is shown in FIG. 7. The public part 4 of the controller 2 comprises a public API 16 which is connected to a database 18 and to a public service module 20 which provides an administration interface 24.

The public API enables the user 8 to interact with the system. Note that in practice different APIs may be provided to access different functionality, as described earlier with reference to FIG. 4. The administrator interface interact with an access central layer (ACL) components to set up permission, etc. for individual users.

Public parts 4 of the controller 2 communicate with private components within the private part 6. The private components comprise the Access Control Layer (ACL) component 40, and a control processor 42. The access control layer 40 conditions outgoing requests according to the redaction policies of the querying customer and their subscription status. The processor component 42 is responsible for the processing functions which have been described, and for communication with database sites 12. Each database site comprises a firewall 41 for security purposes. The database site 12 incorporates a database 12a (one of the databases that has already been described). The database 12a is associated with a database agent or drone 50 which is the component which acts to facilitate receipt of queries from the controller 2 and the execution of running those queries over the database 12a.

The database site 12 shown in FIG. 7 has a database 12a and a database aspect in the form of a drone 50. However, there may be a plurality of drones provided for a particular site, each associated with a distinct database. In the present embodiment, there is a 1:1 relationship between drones and databases. The database site may also have an ID database 400 with its own drone 402. The database site 12 comprises an importer module 52. The importer module 52 plays the role of importing data from a "raw" customer database 54 into the database 12a, against which queries can be run. A configuration file 57 can be provided for controlling the operation of the importer. The configuration file which is supplied to the importer can be manually generated or automatically generated. It defines in particular a set of identifiers which are to be used by the database 12a such that all databases against which queries can be run have at least one common identifier. This could, for example, be personal information such as a name or email address. In addition, certain items of data to populate the data entries may be required by the configuration file. The importer module 52 supplies a configuration file 56 to the drone 50 to inform the drone about the structure of the database 12a against which queries can be run. An example of the configuration file 56 is given in FIG. 7a. The importer module also populate the ID database 400, as described later.

Reference numeral 47 denotes a memory, which could be any form of electronic device or devices. This memory can hold lists of raw IDs with their list identifiers and/or interrogation data structures with their unique identifiers for later use. As previously described, one type of interrogation data structure is a bloom filter. The bloom filter holds information associated with a single key. It can be useful to hold bloom filters for later interrogation of tagging bunkers, but it may not be known what keys would be available in a later interrogated tagging bunker. Therefore storing multiple blooms for different keys would support a wide range of applications at a later time. To provide knowledge of the keys for which bloom filters are stored, HyperLogLog (HLL) structures can be utilised to indicate key coverage (and possibly coverage of a set of combination of keys) in the interrogation data structure (e.g. bloom filter(s). This would allow a user to calculate the optimal key to use when applying the interrogation data structure to the tagging bunker, and also to obtain accuracy/error information in advance, prior to the actual execution of the tagging query.

HyperLogLog structures are known, but are used here for a novel purpose. To obtain a HyperLogLog structure a hash function is applied to each data entry of a dataset to obtain a set of hashes which are assumed to be uniformly distributed random numbers. The set is divided into smaller subsets (each of which may be stored in a register), and the maximum number of leading zeroes is calculated in each subset. This gives an estimate of the cardinality of each subset according to the hyperloglog theory that if the maximum number of leading zeros is n, an estimate for the number of distinct elements in the set is 2 to the power n. By merging the subsets of multiple data sets, an indication of the intersection can be provided.

In the present context, one or more HyperLogLog structures may be created for each data set for which bloom filters are created. The HLL structures can indicate the intersection which is most useful of the interrogation data structures and can thus be used to select which key, or set of keys, would give the best results when applied to a different dataset. The selected key (or set of keys) can be used to access the relevant bloom filter. In one example, there may be a set of two bloom filters (F1, F2) created from respective data sets for respective keys. A larger set of HLLs may be generated by operating on an HLL from each data set to cover the distinct counts of use cases:

| F1 intersect F2 | F1 intersect not F2 |
| F2 intersect F1 | F2 intersect not F1 |

Note that the count for F1 and F2 alone can be deduced from these.

In an alternative embodiment, each database and its drone may be implemented at a separate server; this combination is referred to as a data bunker. Such a data bunker may provide the ID database 400 and its drone 402, and it referred to herein as the 'tagging bunker'.

User requests are handled through the public API via the public service module 20 to the control processor 42. The message "analyse request+drones" in FIG. 7 denotes a request from a user to analyse an input query and to identify the appropriate drones to which the split queries should be sent.

Before describing the use of bloom filters to selectively access identifiers from the tagging bunker, there follows now a more detailed description of bloom filters applied to datasets to allow their use as a filter.

Figure 8:
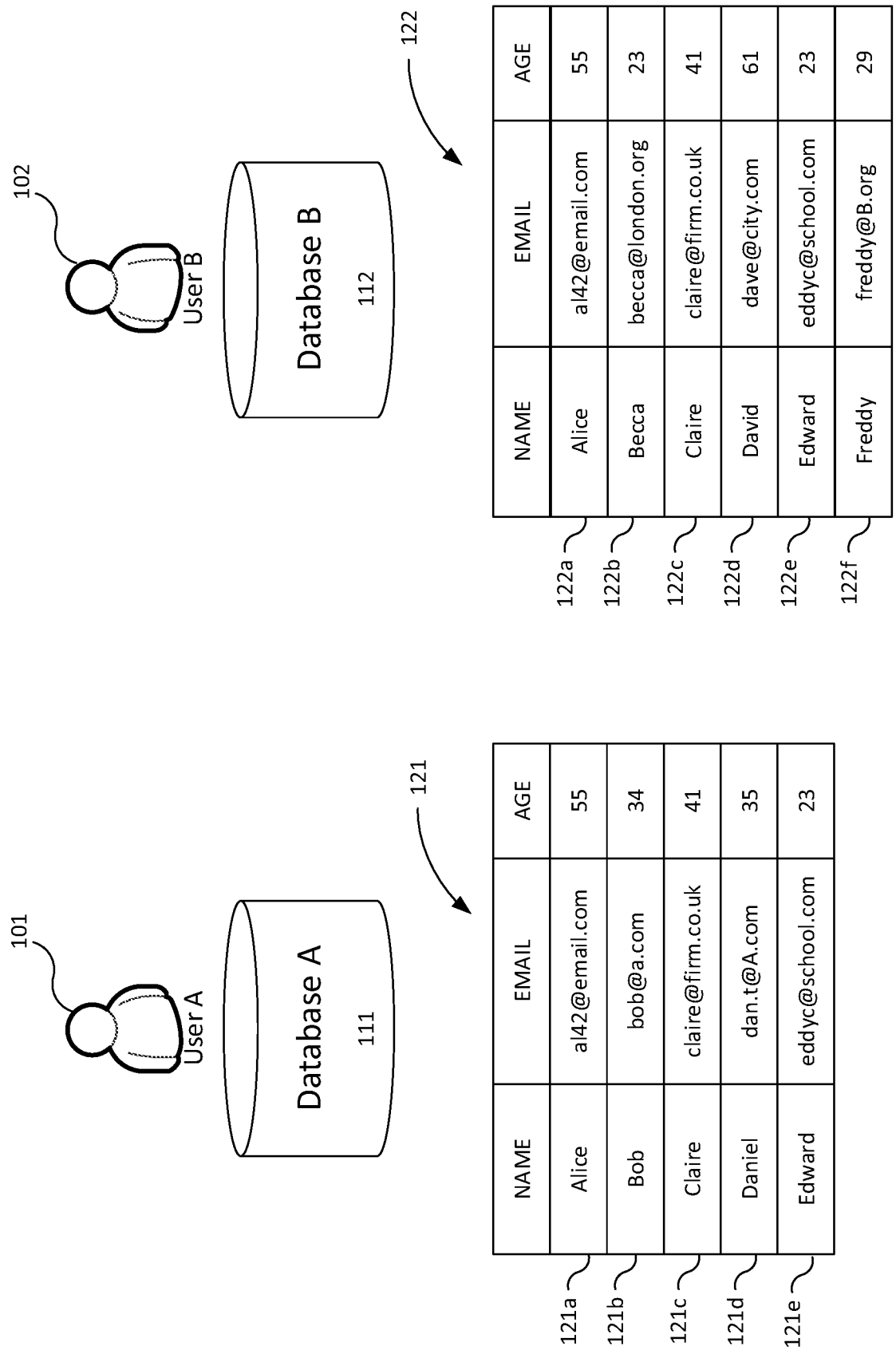
FIG. 8 shows two example datasets to be joined.

FIG. 8 shows a first user 101 (User A) who is the manager of a first server database 111 and a second user 102 (User B) who is the manager of a database 112.

User A uses the first database 111 to store a first data set 121 (Database A) comprising a plurality of entries 121a-e. In this example, each entry 121a-e relates to a person and comprises three fields of information about that person: name; email address; and age. It appreciated that greater or fewer fields may be present and also that only five entries 121a-e are shown for the purposes of explanation. That is, in practice the data set 121 may contain hundreds, thousand, even millions of entries.

Similarly, User B uses the second database 112 to store a second data set 122 (Database B) comprising a plurality of entries 122a-f. This data set 122 also comprises entries having three data fields (again name, email address, and age) but in general the two data set 121, 122 may comprise one or more fields that are not commonly present.

Figure 9:
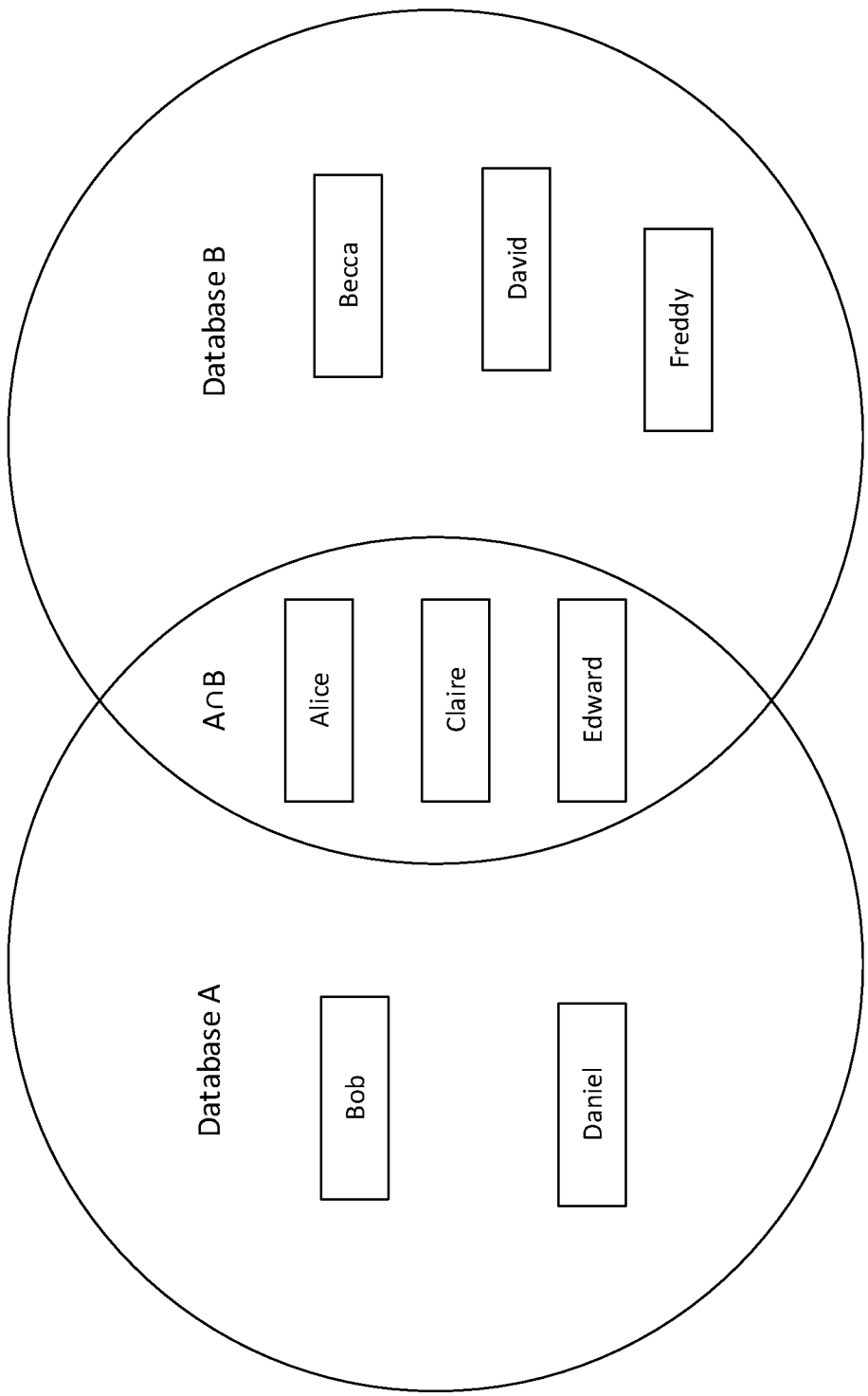
FIG. 9 shows the intersections of two datasets.

As shown in FIG. 8, the first data set 121 contains five entries (people) 121a-e and the second data set 122 contains six entries (people) 122a-f. Some of these are unique to one of the data sets (e.g. "Bob" 121b appears only in the first data set 121 and not in the second 122), but when datasets are to be joined, the assumption is that at least some entries "overlap" or "intersect", i.e. they reference the same person. For example, the first entry 121a in the first data set 121 is "a 55 year old woman called Alice with email address al42@email.com", and the first entry 122a in the second data set 122 is also "a 55 year old woman called Alice with email address al42@email.com". That is, although these are separate data entries 121a, 122a themselves, it can be identified that they should be considered as referring to the same person if there is a match in a field which uniquely identifies that person (such as email address, social security number, etc.). This is particularly useful when the two datasets 121, 122 store different information about the individuals. For example, dataset 121 may additionally (not shown in FIG. 8) store data relating to the income (e.g. salary) of each person and dataset 122 may store data relating to health (e.g. medical records) of each person. The relationship between entries of the datasets can be visualised using a Venn diagram as shown in FIG. 9.

As mentioned above, a binary structure can be generated for each key in the dataset which therefore encodes information about the data entries having that key in that dataset. One example of such a binary structure is a bloom filter. A bloom filter is a bit string of length n onto which has been encoded information about a set of data values. The (n) bits of the bloom filter are all initialised to 0. A data value is encoded onto the filter by applying a set of k hash functions to the data value which each return (modulo n, if the algorithm allows for results greater than k) a respective integer between 1 and n (that is, the data value is transformed into a set of k integers) which are then interpreted as positions within the bit string. The bits at these (k) positions are then re-written to 1. Further data values can be written to the (same) bit string using the same method. If one or more of the hash functions, when writing a further data value, points to a bit in the filter which is already 1 (i.e. written to encode some earlier data value), it remains a 1 after writing the further data value.

Note that k can be equal to 1 (though it usually greater). That is, a single hash function may be used.

The bloom filter, once written, allows for the quick determination that a test data value is not a member of the original (encoding) set. To do so, the same k hashes are performed on the test value. If any one of the bits in the string at those locations is a 0, the test value was not a member of the original set (otherwise this bit would have been rewritten as a 1).

Figure 10:
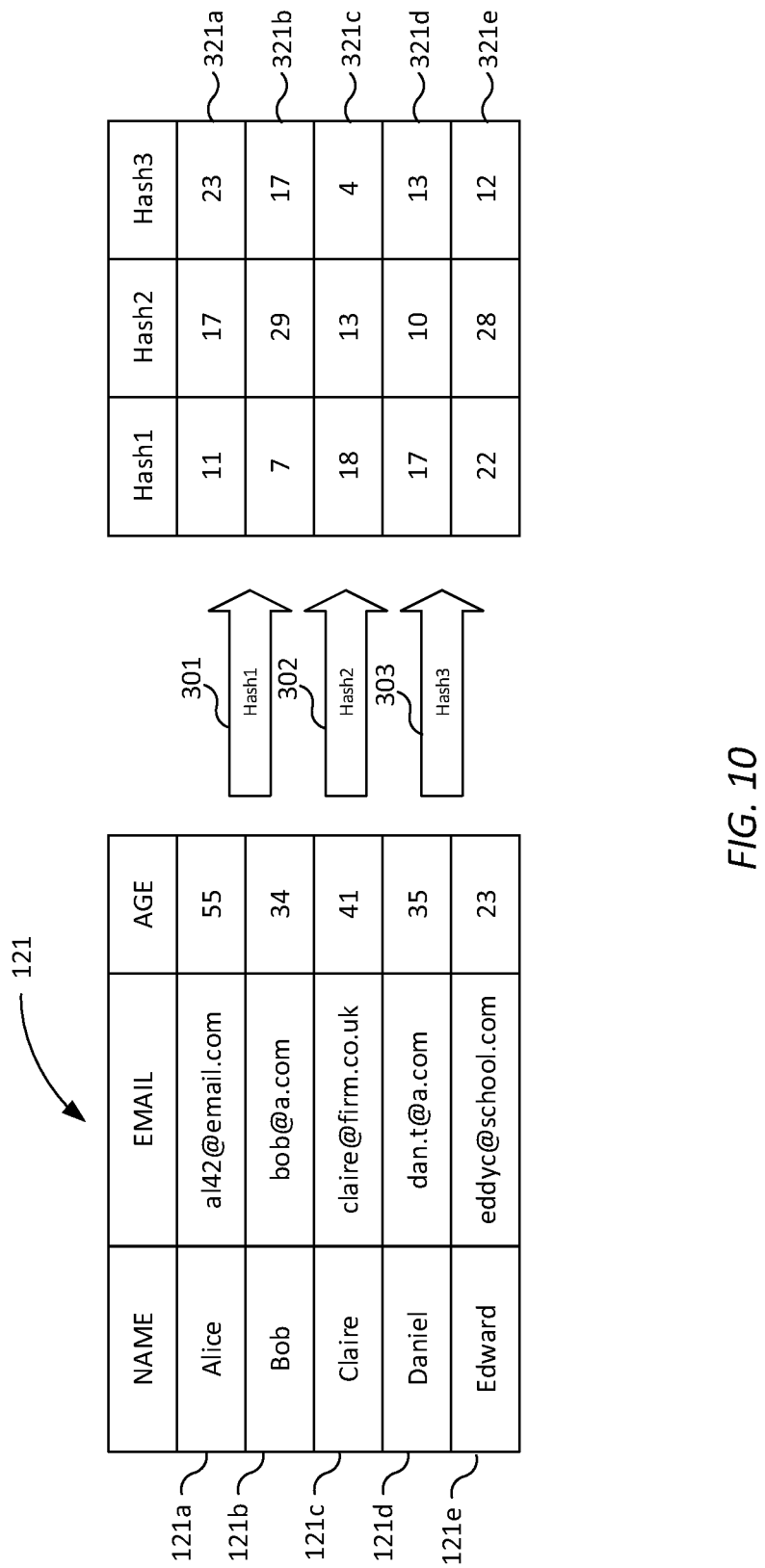
FIGS. 10 and 11 show the construction of a bloom filter.

FIG. 10 shows construction of a first bloom filter 401 from Database A. In this example, n=32 and k=3. That is, the bloom filter is 32 bits in length and three hash algorithms are used.

In FIG. 10, the first hash algorithm 301 (Hash1), the second hash algorithm 302 (Hash2), and the third hash algorithm 303 (Hash3) are each performed on the first data entry 121a (Alice), resulting in a triplet of integers 321a (10, 16, 22). The bits of the bloom filter at these positions are accordingly set to 1. The first data entry 121a is thus encoded in the bloom filter. The same three hash algorithms 301, 302, 303 are applied to each of the other data entries 121b-e resulting in corresponding integer triplets 321b-e which are also written to the bloom filter.

Figure 11:
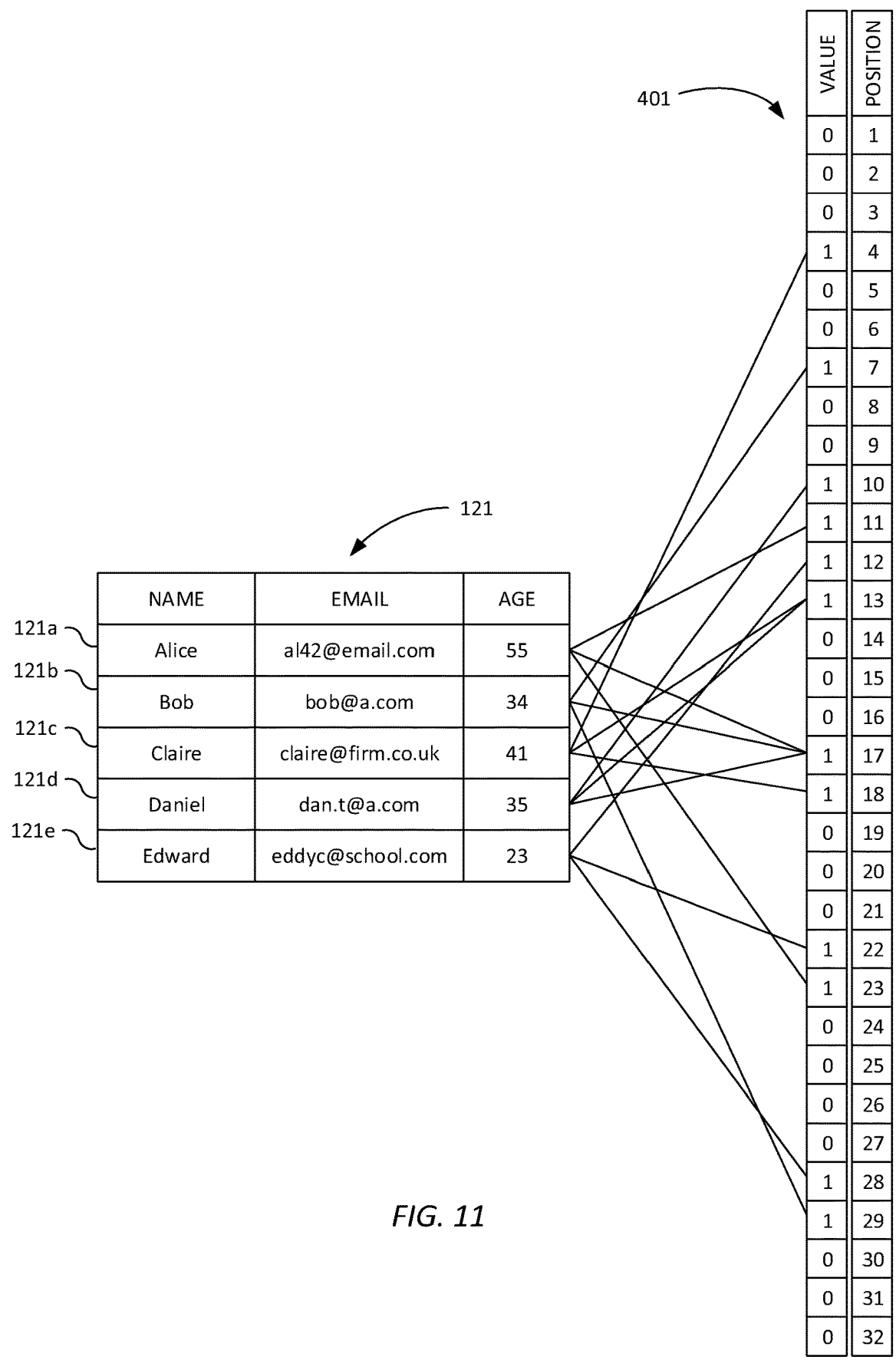

The end result of this process is illustrated in FIG. 11. The resulting bloom filter 401 comprises a string of 32 bits, the values of which encode information about the first database 121. Note that, as known in the art, the hash algorithms 301, 302, 303 are each designed such that, for a random input, they return each integer between 1 and 32 (between 1 and n)

with a uniform distribution. Hence, some data entries 121 when written to the filter 401 may "overlap" in the sense that they may hash to the same integer. If there is no overlap (more likely for large n), then the number of is in the filter will be k per data entry encoded.

The bloom filter 401 can be applied against the Database B, with a query expression, to generate the result set of data entries, which would also be used to generate a bloom filter. Alternatively, a bloom filter describing Database B could be compared with the bloom filter 401 to locate overlapping entries which also satisfy the query expression for Database B. A final resulting bloom filter can be used to access identifiers from the tagging bunker.

The tagging bunker 400, 402 may be used to derive actual identifiers from results from a query run over one or more other bunkers. The tagging bunker stores identifiers (IDs), arranged in a structure corresponding to the principle databases, in association with respective keys. These keys could be record numbers, or hashes of the ID's for example. Such identifiers act as data entries in a database, and can be selectively accessed by applying the set of result data entries (interrogation data structure) in such a way that the corresponding identifiers are returned. One mechanism for achieving this is bloom filters, mentioned earlier.

The following is a description of the use of a tagging bunker to transform a bloom filter resulting from a query run over multiple datasets into a list of identifiers. An example tagging bunker is shown in Table 2.

TABLE 2

Tagging Bunker

| email | #email |
| --- | --- |
| name1@email.com | 987uyt56yhgfr |
| name2@email.com | 543t6yfgtreg4 |
| user@email.com | fe34tegyhg452 |

In this example, the tagging bunker holds a raw identifier (in this case an email address) and a hash of that identifier. Note that the hash of any key associated with the raw email address (e.g. mobile phone number) could be utilised.

The resulting bloom filter (or list of hashes) obtained by running the query across the databases is applied to the tagging bunker to access any entries which are present in the resulting list. The hashed keys of the tagging bunker may be applied to the bloom filter or a bloom filter itself may be generated from the hashed keys of the tagging bunker, and compared with the result bloom filter.

Because the bloom filter was written using entries which satisfied the original query expression(s), the resulting list of entries determined by the controller 2 is thus a list of entries which satisfy the original query.

The user may specify a desired output format. For example, the user may request that an output list is provided as a set of raw identifiers such as email addresses, etc., depending on which formats are stored in the tagging bunker.

A further example use of the tagging bunker is in aiding a third party in determining people who have satisfied a particular dynamic attribute. To do so, a query can be run over one or more bunkers to generate a bloom filter representing a full list of people who have, e.g. redeemed a voucher. For example, each bunker may be owned by a respective retailer and contain information about their customers who have or have not redeemed a specific voucher. The resulting bloom filter in this case represents all people who have redeemed the voucher. The third party is able to use this bloom filter and the tagging bunker to determine a list of raw identifiers of people who have redeemed the voucher, in order to follow up by contacting them for example.

The tagging bunker used by the third party may be owned by the third party. For example, the tagging bunker may store a list of people known to the third party and who the third party has a legitimate right to make contact with. For each of these people, it can be determined (using the bloom filter) whether or not they redeemed the voucher. Hence, the list of people represented in the tagging bunker may or may not be the same as (i.e. may be a sub-set of, or may be a super-set of) the list of people represented in the bloom filter.

Figure 12:
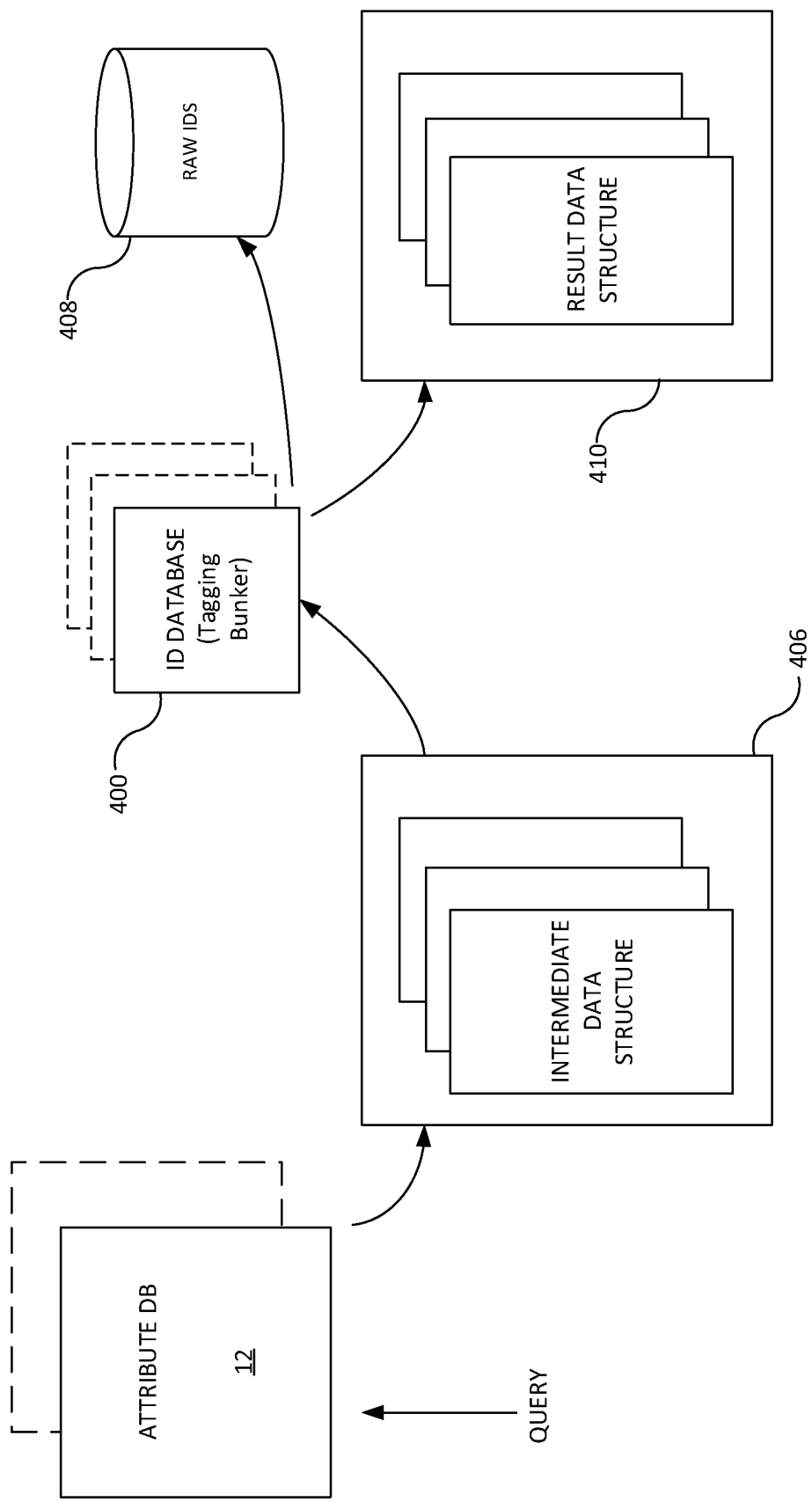
FIG. 12 shows different use cases for the technique described herein.

FIG. 12 is a schematic diagram illustrating different use cases for the technique described herein. FIG. 12 also illustrates the different storage structures which may be utilised in the use cases. A storage structure may be provided by any suitable electronic or computer storage, including different type of memory and/or databases. FIG. 12 shows a query being run against one or more attribute database 12. The output of the query is an intermediate data structure, as referenced above which could be in the form of a list of hashes or a bloom filter. This may be held in a store 406. Each intermediate data structure may be held with the query identifier identifying the query which was run on the original attribute database or databases. The intermediate data structure may be used for comparison with identifiers in the ID database (tagging bunker) 400. The intermediate data structure may be applied directly to one or more tagging bunker or it may be stored in the storage structure 406 for subsequent access. Different third parties may utilise the same intermediate data structure applied against their own respective tagging bunker. This is illustrated diagrammatically by showing dotted versions of different tagging bunkers, which may be owned by the same or different third parties. To apply the intermediate data structure to the tagging bunker, the raw identifiers in the tagging bunker are encoded (e.g. hashed) and then compared against the intermediate data structure. If there are any matches, those raw identifiers can be accessed and stored in a raw identifier storage structure 408. Alternatively, a separate result data structure (for example a bloom filter with the intersecting hash locations set) can be provided in a different storage structure 410. Note that each list of raw identifier may be associated with the original query ID. Also, each result data structure could be associated with the original query ID.

If a list of raw identifiers is available, such as in the raw identifier data structure, another third party who has their own raw identifier may compare it with the raw identifiers in the raw identifier data structure 408 to see if it is present. If it is, they would then know that their own raw identifier has attributes corresponding to the original query. That is, their own raw identifier could be compared with the list of raw identifiers associated with a particular query identifier. Note that in this context their "own" raw identifier implies that they have permission rights to use that raw identifier, not necessarily that this identifies them. A third party may have permission to use multiple raw identifiers and each of them could be tested against the raw identifier database. Similarly, raw identifiers could be hashed and then compared to determine intersections with the result data structure.

In FIG. 12 it is assumed that the set of identifiers which is used to address the ID database will allow entries in that database to be identified. However, there are situations that can arise where the key in the attribute database is of a first type, and the key in the ID databases of a second type. For example, the key of the attribute database might be names, and the key of the ID database might be email addresses.

A solution to this is to provide intermediate mapping entity storing associations between keys of the first and second type. The intermediate mapping entity can itself be a database or any other mapping entity. As this entity maps keys of the first type (in this case names) to keys of the second type (in this case email addresses), it allows correspondences between entries in the attribute database and the ID database to be identified via the intermediate mapping entity, because the intermediate mapping entity allows for conversion between keys of the first type and keys of the second type (and vice-versa). Hence, the above-described methods can be applied in situations in which the attribute database and ID database do not necessarily store entries using the same identifiers.

As mentioned above, in the response that is returned to a requesting user, the raw identifiers of data entries which have been identified as a result of the multiple queries executed across multiple databases and which are present in the tagging bunker may be returned, but only to the owner of the 'tagging bunker' who is assumed to have permission to access these raw identifiers.

As mentioned above, the embodiments described herein enable results across a number of different databases to be returned in response to a single query, in a manner which is "hidden" from a requesting user. Moreover, there is no need to join the records of the databases into a common dataset, so there is no requirement for the databases to be under any kind of common control or ownership.

The databases may be at separate geographical locations. The databases may be at separate IP addresses.

Some examples of filter expressions and their use are illustrated in the following table.

| Filter expression | Example use |
|---|---|
| Operator (>, >=, =, !=, <, <=) | age > 40, Age >= 40, town = "London" |
| Operator between | age between 25 and 30, town between 'a' and 'b' |
| Operator in | age in (15, 16, 24, 25), postcode in ('RG21 1CE', 'RG21 1CD') |
| Operator like | postcode like 'RG21 %' |
| Negated | Not age > 40 |
| Combined via AND | age > 40 and age > 50, town > 'a' and town < 'b' |
| Combined via OR | age > 60 or age < 15 |

These example filter expressions may be applied to form the following example queries:
  distribution(income) where (distribution(gender) where (distribution (age) where job_status !='unemployed')), represents "how is income distributed over genders and ages for not unemployed people".
  distribution (private_health_insurance) where (distribution(age) where (distribution(visits_to_doctor) where age >50 and (income >45000 or retired=true))), represents "how many people have a private health insurance when they are over 50 and earn more than £45000 or are retired" The results are split up into 2 groups that is "age" and "visit to doctor" group".
  sum(purchases) where (distribution(purchase_method) where (distribution(town) where (distribution)purchase_month and purchase_time >'28-10-2015') where age between 18 and 29 and gender='female', represents "how much money have young females spend on purchases split up in the towns they live in, the month they made the purchase, and the method they used in the last 12 months".

As mentioned above, the importer module 52 defines the identifiers which will be used in common between the databases, including the tagging bunker.

It is noted that different customer databases may adopt different column headers for the same expression, therefore the importer module can be arranged to carry out normalisation on the column headers so as to produce a unified category (or identifier) for a given expression. The normalised data are exported from the "normal" database 54 to the database 12a against which queries will be run, the database 12a constituting an intermediate recipient database for the purpose of running the queries. It is possible to share high level data statistics between the databases once normalisation is finished, or while the database is being normalised. Normalisation can be carried out manually or automatically.

The invention claimed is:

1. A method of determining from an identity database raw identifiers of data entries of at least one attribute database, the data entries which have been determined as entities satisfying a set of attributes, wherein the identity database does not hold any of the set of attributes in association with any identifiers in the identity database, the method comprising:
  providing an interrogation data structure which has been generated by accessing the at least one attribute database, the interrogation structure representing encoded identifiers of the data entries satisfying at least one attribute; and
  applying the interrogation data structure to encoded identifiers of the raw identifiers held in the identity database to determine any raw identifiers in the identity database which correspond to the encoded identifiers in the interrogation data structure,
  wherein the interrogation data structure is provided by:
    accessing, with a query defining the set of attributes, the attribute database which holds attributes in association with respective identifiers to determine a set of data entries in the attribute database which satisfies the set of attributes; and
    encoding the identifiers of the set of result entries to generate the interrogation data structure wherein access permissions for the at least one attribute database are different from access permissions for the identity database.

2. The method according to claim 1, wherein multiple interrogation data structures are provided by accessing respective attribute databases with respective queries.

3. The method according to claim 2, comprising performing one or more set operation on two or more of the interrogation data structures to generate a set-operated interrogation data structure to apply to the identity database.

4. The method according to claim 1 wherein the step of applying the interrogation data structure to encoded versions of identifiers held in the identity database comprises performing a set operation to separate a first set of raw identifiers from a second set of raw identifiers based on encoded identifiers in the interrogation data structure.

5. The method according to claim 4 wherein the set operation is one of: a match operation to extract a set of raw identifiers which correspond to the encoded identifiers in the interrogation data structure; and an exclusion operation to extract a set of raw identifiers which do not correspond to the encoded identifiers in the interrogation data structure.

6. The method according to claim 4 wherein the step of applying the or each interrogation data structure to encoded versions of identifiers held in the identity database generates one or more result data structure which indicates the first set of raw identifiers resulting from the set operation.

7. The method according to claim 6 comprising the step of supplying from a requestor a raw identifier, encoding the raw identifier and testing the encoded raw identifier against at least some of the result data structures to determine whether or not that raw identifier possesses the set of attributes.

8. The method according to claim 6 comprising publishing at least some of the result data structures for access by at least one third party who has access permissions to a third party database comprising identifiers of entities but who does not have access permissions for the identity database.

9. The method according to claim 6 comprising performing a set operation on two or more of the result data structures to generate a set-operated result data structure.

10. The method according to claim 6 wherein the result data structure comprises one of a list of hashes, each hash representing an encoded identifier, and a bloom filter with values set at locations corresponding to hashes of the encoded identifiers.

11. The method according to claim 1, comprising the step of storing the or each interrogation data structure with a respective unique identifier which associates the interrogation data structure with the query.

12. The method according to claim 1 comprising the step of applying the or each interrogation data structure to at least one second identity database which holds respective raw identifiers in association with encoded identifiers, but which does not hold the set of attributes in association with any identifiers in the second identity database.

13. The method according to claim 1, comprising the step of storing the or each interrogation data structure with a hyperloglog structure which provides information for the key(s) in the interrogation data structure.

14. The method according to claim 1 wherein the interrogation data structure is one of: a list of hashes, each hash representing an encoded identifier, and a bloom filter with values set at locations corresponding to hashes of the encoded identifiers.

15. The method according to claim 1 wherein the raw identifiers when accessed are in plain text form.

16. The method according to claim 1 wherein the raw identifiers comprise contact information of an entity identified by the identifier.

17. The method according to claim 1, wherein the query defines at least one second attribute, the method comprising:
applying the identifiers of the first set of result entries to a second attribute database, with the at least one second query, to generate a second set of entries, the second set constituting the set of result entries.

18. A computer system for determining from an identity database raw identifiers of data entries of at least one attribute database, the data entries which have been determined as entities satisfying a set of attributes, wherein the identity database does not hold any of the set of attributes in association with any identifiers in the identity database, the computer system comprising:
electronic storage configured to store an interrogation data structure which has been generated by accessing the at least one attribute database, the interrogation data structure representing encoded identifiers of the data entries satisfying the at least one attribute; and
a hardware processor configured to execute a computer program which applies the interrogation data structure to encoded identifiers of raw identifiers held in the identity database to determine any raw identifiers in the identity database which correspond to the encoded identifiers in the interrogation data structure,
wherein the interrogation data structure is provided by:
accessing, with a query defining the set of attributes, the attribute database which holds attributes in association with respective identifiers to determine a set of data entries in the attribute database which satisfies the set of attributes; and
encoding the identifiers of the set of result entries to generate the interrogation data structure wherein access permissions for the at least one attribute database are different from access permissions for the identity database.

19. A computer program product comprising computer readable instructions on a non-transitory medium which when executed in a processor implements a method of determining from an identity database raw identifiers of data entries of at least one attribute database, the data entries which have been determined as entities satisfying a set of attributes, wherein the identity database does not hold any of the set of attributes in association with any identifiers in the identity database, the method comprising:
providing an interrogation data structure which has been generated by accessing the at least one attribute database, the interrogation data structure representing encoded identifiers of the data entries satisfying the at least one attribute; and
applying the interrogation data structure to encoded identifiers of raw identifiers held in the identity database to determine any raw identifiers in the identity database which correspond to the encoded identifiers in the interrogation data structure,
wherein the interrogation data structure is provided by:
accessing, with a query defining the set of attributes, the attribute database which holds attributes in association with respective identifiers to determine a set of data entries in the attribute database which satisfies the set of attributes; and
encoding the identifiers of the set of result entries to generate the interrogation data structure wherein access permissions for the at least one attribute database are different from access permissions for the identity database.

* * * * *